Jan. 21, 1969       R. L. WEBER       3,423,209
BREWING SELECTIVELY VARIABLE QUANTITIES OF COFFEE
Filed Nov. 23, 1965                Sheet _/_ of 2

INVENTOR.
ROBERT L. WEBER
BY
Davis, Hoxie, Faithfull & Hapgood
ATTORNEYS.

INVENTOR.
ROBERT L. WEBER

United States Patent Office 3,423,209
Patented Jan. 21, 1969

3,423,209
BREWING SELECTABLE VARIABLE QUANTITIES OF COFFEE
Robert L. Weber, Clapboard Hill Road,
New Canaan, Conn. 06840
Filed Nov. 23, 1965, Ser. No. 509,278
U.S. Cl. 99—71　　　　　　　　　　　2 Claims
Int. Cl. A23f 1/00

ABSTRACT OF THE DISCLOSURE

Selectively variable quantities of coffee are brewed by placing a measured quantity of ground coffee in an infusion chamber, forcing a measured quantity of hot water into the infusion chamber by means of pressure. The flow rate of the hot water through the grounds is selectively varied to provide a constant contact time for the water and grounds, irrespective of the quantity of coffee being brewed.

---

The problems of consistently brewing a good cup of coffee have perplexed men for centuries. Only recently have standards of flavor and strength been established by the Coffee Brewing Institute in an attempt to reduce the variables of subjective evaluation to quantitative terms which reflect the quality of the brew.

The most significant variables affecting the brewed coffee are the coffee-to-water ratio, the temperature of the water when introduced to the ground coffee, and the infusion time during which the ground coffee contacts the hot water.

Strength and flavor are somewhat independent. Strength is a matter of personal taste which is largely determined by the coffee-to-water ratio selected by the user. Once the desired strength is determined, the coffee-to-water ratio is held constant by consistent and accurate measurement. Flavor is a more elusive quantity. It varies in character with the bean and roast. It varies in quality with infusion time and temperature. Temperatures too high extract harsh and bitter fractions from the beans; temperatures too low fail to extract the desirable fractions and reduce aroma. Infusion times too long soak out the bitter fractions and infusion times too short yield an undeveloped brew.

For any good brand of coffee bean, the highest quality of flavor will be extracted at a temperature of 190° F.±5° and infusion time of just about 1 minute.

Most presently available coffee makers introduce the water to the coffee at 212° F. This is far too hot. They also suffer from an infusion time which varies with the quantity of coffee being brewed. In addition, the water remaining in the grounds after the brewing is completed slowly drips into the final product bringing with it the bitter extracts soaked from the spent grounds.

The objectives of the present invention are to provide a method and apparatus for brewing coffee at the proper temperature and with a constant infusion time which is independent of the quantity of coffee brewed.

In accordance with the invention, I have provided a coffee maker which includes a pressurized heating chamber from which water at the proper temperature is forced through an infusion chamber containing the ground coffee in a constant time period.

In the drawings FIGURE 1 is a schematic illustration showing the relationship of the various parts of a preferred embodiment of the present invention.

Figure 1:
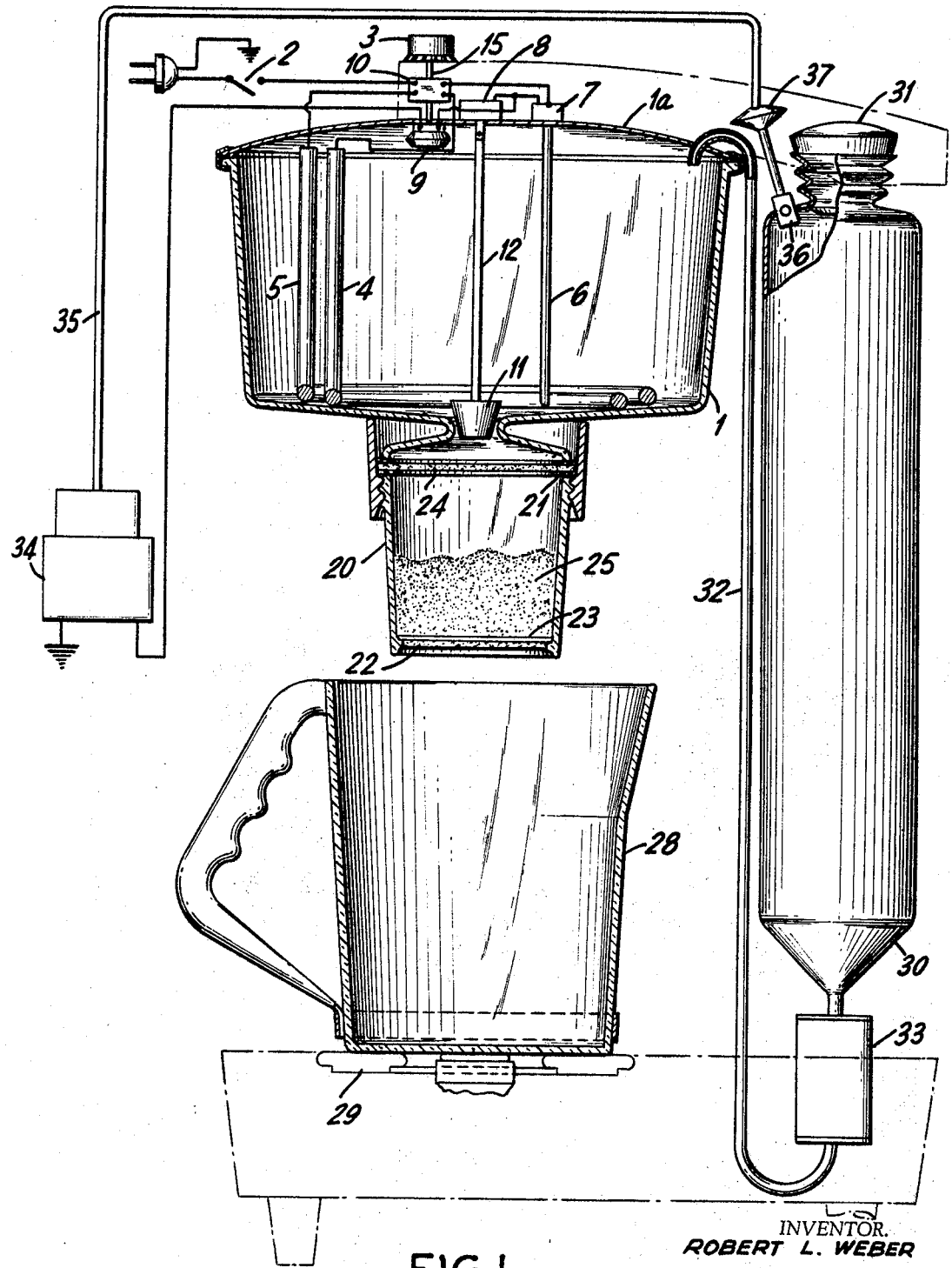
Figure 2:
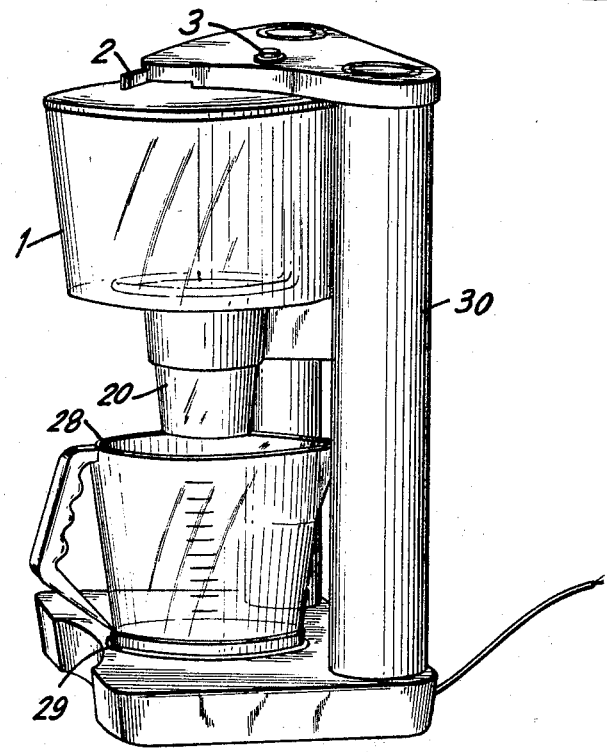
FIGURE 2 is a perspective view showing the general appearance of a preferred embodiment of the present invention.

The coffee maker shown in FIGURE 1 has a frame member which supports a pressure-tight heating chamber 1 and infusion cup 20 above the coffee receiving vessel 28. The receiving vessel rests on a thermostatically controlled heater 29 which keeps the brewed coffee at proper temperature. The frame includes a reservoir 30 for a measured quantity of water. A pressure-tight cap 31 seals the reservoir 30. Water pipe 32 leads to a water filter 33. The coffee maker also includes a water filter 33 and an air compressor 34. Air line 35 leads to the top of water reservoir 30 and is equipped with a check valve 36 and moisture filter 37 to prevent any back flow of water into the air line 35.

At the top of the frame is the cup selector knob 3 and start switch 2. The cup selector knob 3 adjusts a variable pressure limit switch 9 which stops the air compressor when the pressure in the system reaches a value determined by the number of cups selected on the knob. The heating chamber 1 is of Pyrex glass and is rendered pressure-tight by lid 1a. The heaters 4 and 5 within the heating chamber are of different power ratings as for example 600 watts and 1000 watts respectively. Cup selector knob 3 in addition to adjusting variable pressure switch 9, controls a heater selector switch 10 which causes either or both heaters to be energized. For small quantities of coffee from 2–6 cups, only heater 4 of 600 watt capacity is energized. For larger quantities of coffee from 7–12 cups, only heater 5 of 1000 watt capacity is energized. For 13–20 cups, both heaters 4 and 5 for a total of 1600 watts are energized. The matching of heater capacity to the quantity of coffee being brewed allows the machine to make all quantities of coffee in approximately the same total time. Supported by the top of the frame is a temperature probe 6 which actuates temperature limit switch 7 which controls the heaters 4 and 5 and actuates solenoid 8 which operates valve 11 in the bottom of the heating chamber via rod 12.

Below the heating chamber and connected thereto by a pressure-tight seal 21 is the infusion cup 20. The infusion cup is also of Pyrex. It has a foraminous ceramic bottom 22 which supports a disc of filter paper 23. At the top of the chamber is another foraminous ceramic disc 24 which distributes the incoming water evenly over the ground coffee 25 and also prevents coffee from splashing back into the heating chamber.

In operation, a quantity of cold water sufficient for the desired quantity of coffee is poured into the reservoir 30 and the reservoir closed with the pressure-tight cap 31. The quantity of water is conveniently measured by means of the receiving vessel 28 which is calibrated in "cups." This unit of measurement takes into account the fraction of the water which remains with the wet grounds so as to provide as many finished cups of coffee as indicated on the "cups" scale of the receiving vessel.

The infusion cup 20 is detached from the heating chamber 1 and a filter paper disc 23 is placed on the foraminous bottom 22. Ground coffee is measured into the cup. The coffee-to-water ratio (strength) is varied by the measurement of coffee. The cup is reattached to the heating chamber.

The cup selector knob 3 is turned to the desired number of cups and the power switch 2 is turned on. Air compressor 34 starts and delivers air under pressure to the reservoir 30 thus forcing all the water out of the reservoir through the filter 33 where contaminants are removed and the dissolved mineral content reduced to soften the water. The water is forced through the filter into the heating chamber 1 where it is heated by means of heater elements 4 and 5. The air compressor continues to raise the pressure in the sealed system until the pressure in the heating chamber reaches a value determined by the cup selector knob on the pressure actuated variable limit switch 9. This switch stops the compressor 34. When the water reaches 190° F., temperature probe 6 actuates temperature limit switch 7 thereby disconnecting the power to the air compressor circuit and to the heaters and simultaneously actuating solenoid 8 which raises valve 11 in the bottom of the chamber. The hot water is forced from the heating chamber 1 by the air pressure in the system into the infusion cup where brewing occurs. The air under a pressure previously determined by the cup selector knob forces the hot water through the infusion cup and forces the resultant coffee brew through the paper filter 23 into the receiving vessel 28. The air under pressure remaining in the system passes through the spent coffee grounds in the infusion cup to remove any remaining water thereby eliminating a later drip of bitter residue into the freshly brewed coffee.

The coffee in the receiving vessel is maintained at 190° F. by means of the thermostatically controlled heater 29.

To maintain a constant infusion time of 1 minute with any desired quantity of coffee brew, the pressure of the air from the compressor must be regulated. The resistance to flow of the water through the coffee grounds increases with the quantity of grounds. Also, at higher quantities, a larger volume of hot water must be forced through the ground coffee within the constant time period. Thus, higher pressures of air are required to overcome both these factors. The cup selector knob 3 adjusts the pressure actuated limit switch 9 to regulate the pressure in the closed system to match the requirements for the number of cups selected. I have found that the pressure required varies somewhat with the bulk density of the ground coffee and the choice of filter paper. To accommodate these factors, the cup selector knob can be loosened and moved on the shaft of the variable pressure switch. In practice, a type of coffee grind (bulk density) and specific brand of filter would be recommended to the purchaser and the cup selector knob set accordingly during manufacture. For a particular bulk density and paper, I found that approximately 7 p.s.i. of air was required for 2 cups, approximately 11 p.s.i. for 14 cups, and approximately 20 p.s.i. for 20 cups. Thus the pressure switch should have a range of about 5 p.s.i. to 25 p.s.i. to accommodate a change in the type of grind or in the filter paper.

Figure 3:
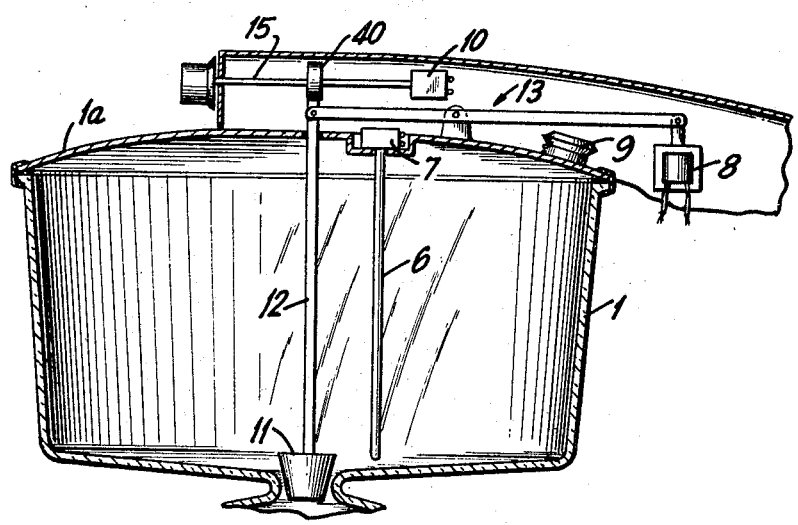
FIGURE 3 is a partial view showing an embodiment of the present invention.

In another embodiment of the present invention, control of the flow of hot water for a constant infusion time is accomplished by varying the clearance of the solenoid actuated valve 11. This embodiment is shown in FIGURE 3. The pressure limit switch is set to that pressure required for a maximum quantity of brew and is permanently fixed at that setting. Control of hot water flow is accomplished by means of a cam 40 which is adjusted by the cup selector knob 3. This cam 40 determines the lift of valve 11 by limiting the motion of valve operating rod 12. The valve 11 thus throttles the hot water flow. The valve lift is determined to provide for a constant infusion time and the cam cut accordingly. Solenoid 8 pulls down on lever 13 to actuate the valve.

In those areas where the water is very pure or where the water is pre-filtered and softened, the reservoir and filter could be eliminated and the water directly introduced to the heating chamber through a sealing cap or a valve. In that event a heating chamber should be used having increased volume so as to maintain the total air capacity of the modified system approximately the same as that of the system including a reservoir. This permits operation within the specified range of pressures.

It will be apparent that many modifications may be made within the scope and spirit of my invention and, accordingly, I do not wish to be limited otherwise than as indicated by the terms of the appended claims.

I claim:
1. The method of brewing selectively variable quantities of coffee in apparatus comprising an infusion chamber, a sealable hot water vessel having an associated source of air under pressure, means to vary the flow rate of hot water through the infusion chamber, and a receiving vessel, which method comprises;
   (a) placing a measured quantity of ground coffee in said infusion chamber,
   (b) forcing a measured quantity of hot water from the hot water vessel to the infusion chamber by means of said air under pressure,
   (c) forcing the hot water through the ground coffee in the infusion chamber and forcing the resultant brew from said infusion chamber into said receiving vessel by means of said air under pressure,
   (d) selectively varying the flow rate of the hot water through the coffee grounds so as to provide a constant time in which the hot water and the ground coffee are in contact irrespective of the quantity of coffee being brewed.

2. The method of brewing selectively variable quantities of coffee in an apparatus comprising a pressure tight infusion chamber, a sealable vessel for containing a measured quantity of hot water at a desired temperature, means to pressurize the vessel, and means to vary the flow rate of hot water through the infusion chamber which method comprises,
   (a) placing a measured quantity of ground coffee in said infusion chamber,
   (b) forcing a quantity of hot water appropriate for the quantity of coffee from the vessel to the infusion chamber by said pressure means,
   (c) forcing the hot water through the ground coffee in the infusion chamber and forcing the resultant brew from said infusion chamber by said pressure means,
   (d) selectively varying the flow rate of hot water through the ground coffee so as to provide a constant time in which the hot water infuses with the ground coffee.

References Cited

UNITED STATES PATENTS

| | | | |
|---|---|---|---|
| 2,176,082 | 10/1939 | Kise | 99—71 X |
| 2,464,862 | 3/1949 | Herrera | 99—302 |
| 3,333,964 | 8/1967 | Bender | 99—71 |

MAURICE W. GREENSTEIN, *Primary Examiner.*

U.S. Cl. X.R.

99—65, 282, 283, 299, 302, 307